(12) United States Patent
Nagatani et al.

(10) Patent No.: US 7,154,954 B1
(45) Date of Patent: Dec. 26, 2006

(54) COMMUNICATION SYSTEM

(75) Inventors: Yuji Nagatani, Wako (JP); Kazuya Iwamoto, Wako (JP); Hiroshi Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 696 days.

(21) Appl. No.: 09/618,848

(22) Filed: Jul. 18, 2000

(51) Int. Cl.
*H04B 3/00* (2006.01)
*H04L 25/00* (2006.01)

(52) U.S. Cl. .................... 375/257; 375/285; 375/350; 375/319; 327/309; 327/321; 333/1; 333/17.2

(58) Field of Classification Search ............... 375/257, 375/259, 295, 316, 317, 350; 333/124, 125, 333/126, 127, 128, 129, 130, 17.2, 24 R, 333/180; 327/309, 306, 321
See application file for complete search history.

(56) References Cited

U.S. PATENT DOCUMENTS

| | | | |
|---|---|---|---|
| 4,167,709 A * | 9/1979 | Papson ................ | 330/276 |
| 5,323,072 A * | 6/1994 | Fisch et al. .......... | 327/310 |
| 5,357,156 A * | 10/1994 | Herrington .......... | 327/310 |
| 5,408,500 A | 4/1995 | Ginzburg et al. | |
| 5,896,417 A * | 4/1999 | Lau ..................... | 375/258 |
| 6,115,831 A * | 9/2000 | Hanf et al. .......... | 714/43 |
| 6,127,840 A * | 10/2000 | Coteus et al. ....... | 326/30 |
| 6,396,282 B1 * | 5/2002 | Minuth et al. ....... | 324/509 |

FOREIGN PATENT DOCUMENTS

| | | |
|---|---|---|
| EP | 0 337 762 B1 | 10/1989 |
| JP | 51-67662 | 5/1976 |
| JP | 59-056027 | 3/1984 |
| JP | 62-208734 | 9/1987 |
| JP | 62-225044 | 10/1987 |
| JP | 01-200853 | 8/1989 |
| JP | 01-261047 | 10/1989 |
| JP | 03-212039 | 9/1991 |
| JP | 07-162246 | 6/1995 |
| JP | 07-245652 | 9/1995 |
| JP | 09-238164 | 9/1997 |
| JP | 09-284874 | 10/1997 |
| JP | 10-041981 | 2/1998 |
| JP | 10-215229 | 8/1998 |

OTHER PUBLICATIONS

German Office Action, dated Feb. 14, 2006.

* cited by examiner

*Primary Examiner*—Jean B Corrielus
(74) *Attorney, Agent, or Firm*—Lahive & Cockfield LLP; Anthony A. Laurentano, Esq.

(57) ABSTRACT

A communication system in which a reception signal can be accurately obtained from a signal transmitted over two-wire type transmission lines without any significant reduction in the communication speed. The communication system utilizing two-wire type transmission lines for transmitting transmission signals in opposite phases has a plurality of nodes connected to the two-wire type transmission lines, and each of the nodes incorporates terminating resistors acting upon the two-wire type transmission lines. A node which includes a reception circuit for receiving a transmission signal has an AC coupling circuit for extracting AC components in a transmission signal input through the transmission lines, a bias circuit for applying a bias voltage to a signal output from the AC coupling circuit and a clip circuit for clipping the level of a signal output from the bias circuit, which are provided at each of the two-wire type transmission lines.

2 Claims, 9 Drawing Sheets

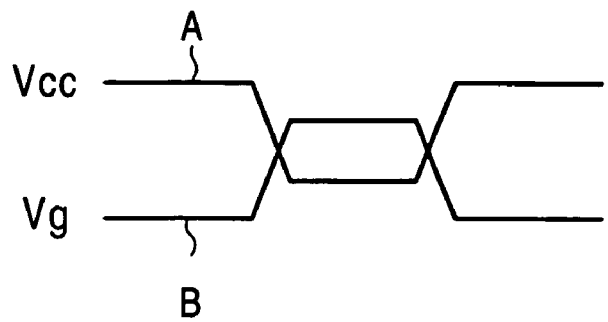
FIG. 2A
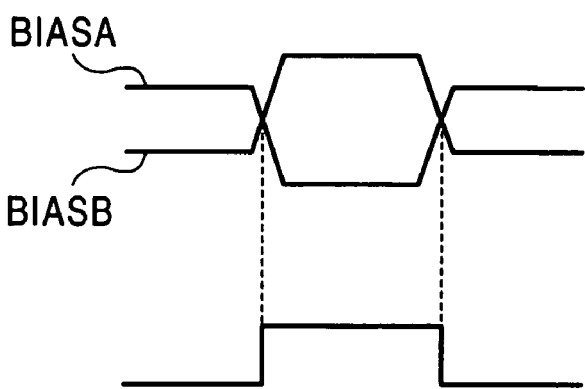
FIG. 2B
FIG. 2C
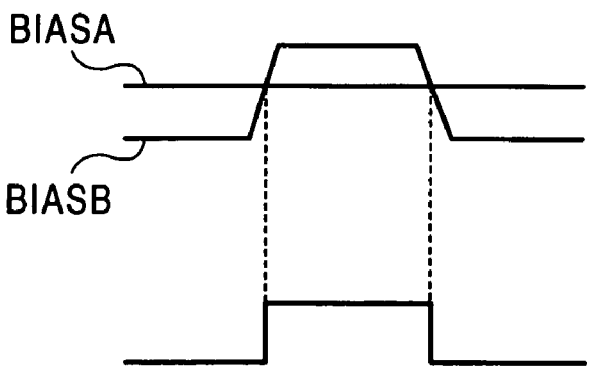
FIG. 2D
FIG. 2E
FIG. 2F
PRIOR ART R0 : RESISTANCE PER 1m
L0 : INDUCTANCE PER 1m
C0 : CAPACITANCE PER 1m

COMMUNICATION SYSTEM

BACKGROUND OF THE INVENTION

1. Field of the Invention

The present invention relates to a communication system having a plurality of nodes connected to a common transmission line.

2. Description of the Related Art

In a conventional communication system, as shown in FIG. 1, a plurality of nodes, i.e., transmission/reception circuits $3_1$ through $3_n$ are connected to two-wire type transmission lines 1 and 2. All of the transmission/reception circuits $3_1$ through $3_n$ have the same configuration. A positive potential Vcc (e.g., 5 V) is supplied to one end of the transmission line 1 through a terminating resistor 4, and the positive potential Vcc is similarly supplied to the other end of the transmission line 1 through a terminating resistor 5. A ground potential Vg (e.g., 0 V) is supplied to one end of the transmission line 2 through a terminating resistor 6, and the ground potential Vg is similarly supplied to the other end of the transmission line 2 through a terminating resistor 7.

In the transmission/reception circuit $3_1$, bidirectional input/output filter 11 is connected to the transmission lines 1 and 2 through a connector 12. Transmission signals are separately supplied through a non-inverting amplifier circuit 13 and an inverting amplifier circuit 14 to connection terminals B1 and B2 of the input/output filter 11 located opposite to terminals A1 and A2 thereof connected to the transmission lines 1 and 2. Bias circuits 17 and 18 are connected to the connection terminals B1 and B2 of the filter 11 through respective AC coupling circuits 15 and 16 which are formed by a resistor and a capacitor. Signals provided by the bias circuits 17 and 18 are passed through a differential amplifier 19 to provide a reception signal.

When a transmission signal is output, the transmission signal is amplified by the non-inverting amplifier circuit 13 and is inverted and amplified by the inverting amplifier circuit 14. Transmission signals in opposite phases are supplied from the non-inverting amplifier circuit 13 and inverting amplifier circuit 14 to the filter 11. The filter 11 performs low-pass filtering of those transmission signals separately. The transmission signal output by the non-inverting amplifier circuit 13 is supplied to the transmission line 2 through the filter 11, and the transmission signal output by the inverting amplifier circuit 14 is supplied to the transmission line 1 through the filter 11.

A signal transmitted over each of the respective transmission lines 1 and 2 is supplied to the filter 11, and the filter 11 performs low-pass filtering of those transmission signals separately to output the signals to the AC coupling circuits 15 and 16. The AC coupling circuits 15 and 16 extract AC components in the transmission signals and supplies the components to the bias circuits 17 and 18.

For example, when a signal A transmitted over the transmission line 1 and a signal B transmitted over the transmission line 2 have respective opposite phases to each other as shown in FIG. 2A, the bias circuit 17 applies a bias voltage to the transmission signal A to provide a biased signal BIASA and the bias circuit 18 applies a bias voltage to the transmission signal B to provide a biased signal BIASB as shown in FIG. 2B. The signals output by the bias circuits 17 and 18 are detected by the differential amplifier 19 as a reception signal as shown in FIG. 2C.

When the transmission line 1 is broken, since only the signal B is transmitted over the transmission line 2, the biased signal BIASB provided by applying a bias voltage to the signal B transmitted over the transmission line 2 changes similarly to the way the signal B changes, while the biased signal BIASA remains constant without changing as shown in FIG. 2D. At the differential amplifier 19, the constant biased signal BIASA is compared with the biased signal BIASB to provide a reception signal as shown in FIG. 2E. Similar situations occur when the transmission line 1 is grounded and when the transmission line 2 is broken or grounded.

If the bias circuits 17 and 18 are not provided, the signals A and B input to the differential amplifier 19 will appear as shown in FIG. 2F when the transmission line 1 is broken, which disables the detection of a reception signal.

The configuration and operation of the transmission/reception circuits $3_2$ through $3_n$ are the same as those of the transmission/reception circuit $3_1$ described above. A conventional communication system as described above is disclosed, for example, in Japanese unexamined patent publication No. H3-171849.

As shown in FIG. 3, an equivalent circuit of the two-wire type transmission lines 1 and 2 can be represented by a resistance R0, inductance L0 and capacitance C0 per unit length.

A capacitance C1 also exists in each of the transmission/reception circuits $3_1$ through $3_n$ as shown in FIG. 4. The rising edge and the falling edge of a transmission signal undergo transient changes under influence of those capacitances. Referring to the transmission line 1, the resistance R of the terminating resistors 4 and 5 and the capacitance C consisting of the capacitances C0 and C1 cooperate to form a time constant to cause transient changes in the rise and fall of the waveform of a signal transmitted over the transmission line 1 as shown in FIG. 6.

However, when there is a break somewhere in the transmission line 1 for example, since the resistance R is doubled, the time constant is also doubled if any change of the capacitance C is ignored. As a result, the waveform of the signal transmitted over the transmission line 1 becomes significantly less sharp. This similarly occurs in the case of poor contact between each transmission/reception circuit and the transmission line 1, and the waveform of a transmission signal is significantly affected by the time constant in the case of line breakage or poor contact not only in the transmission line 1 but also in the transmission line 2. A problem has arisen in a transmission/reception circuit in that it is impossible to accurately obtain a reception signal from a transmission signal having a transient waveform under such influence of a large time constant without decreasing the communication speed.

OBJECT AND SUMMARY OF THE INVENTION

It is therefore an object of the invention to provide a communication system and a reception circuit therefor which can accurately obtain a reception signal from a signal transmitted over two-wire type transmission lines without significantly decreasing the communication speed.

A communication system according to the invention is a communication system utilizing two-wire type transmission lines for transmitting transmission signals in opposite phases, characterized in that it has a plurality of nodes connected to the two-wire type transmission lines and in that each of the nodes incorporates terminating resistors associated with the two-wire type transmission lines.

In such a communication system according to the invention, since each of the nodes incorporates terminating resistors associated with the two-wire type transmission lines, no increase in the time constant occurs in the transmission lines when viewed from a node even when there is a break of one of the transmission lines or poor contact between the node and the transmission line, which makes it possible to accurately obtain a reception signal from a signal transmitted over the two-wire type transmission lines without any reduction in the communication speed.

A communication system according to the invention has a reception circuit as a node for receiving a transmission signal, and the reception circuit has an AC coupling circuit for extracting AC components in a transmission signal input through a transmission line, a bias circuit for applying a bias voltage to the signal output of the AC coupling circuit, and a clip circuit for clipping the level of the signal output from the bias circuit, which are provided for each of the two-wire type transmission lines.

In such a communication system according to the invention, the characteristics of a trailing edge of a reception signal can be improved even in the case of reception of a transmission signal having a transient waveform under the influence of a large time constant, which allows communication at a high speed.

The reception circuit of the invention is a reception circuit for receiving a transmission signal in a communication system utilizing two-wire type transmission lines for transmitting transmission signals in opposite phases, characterized in that it has an AC coupling circuit for extracting AC components in a transmission signal input through the transmission lines, a bias circuit for applying a bias voltage to a signal output from the AC coupling circuit, and a clip circuit for clipping the level of a signal output from the bias circuit, which are provided for each of the two-wire type transmission lines.

With a reception circuit having such a configuration, the characteristics of the trailing edge of a reception signal can be improved even in the case of reception of a transmission signal having a transient waveform under the influence of a large time constant, which makes it possible to configure a reception circuit capable of communication at a high speed.

BRIEF DESCRIPTION OF THE DRAWINGS

FIGS. 2A through 2F are waveform diagrams showing signal transmission in a conventional communication system.

DETAILED DESCRIPTION OF PREFERRED EMBODIMENT

An embodiment of the invention will now be described in detail with reference to the drawings.

Figure 1:
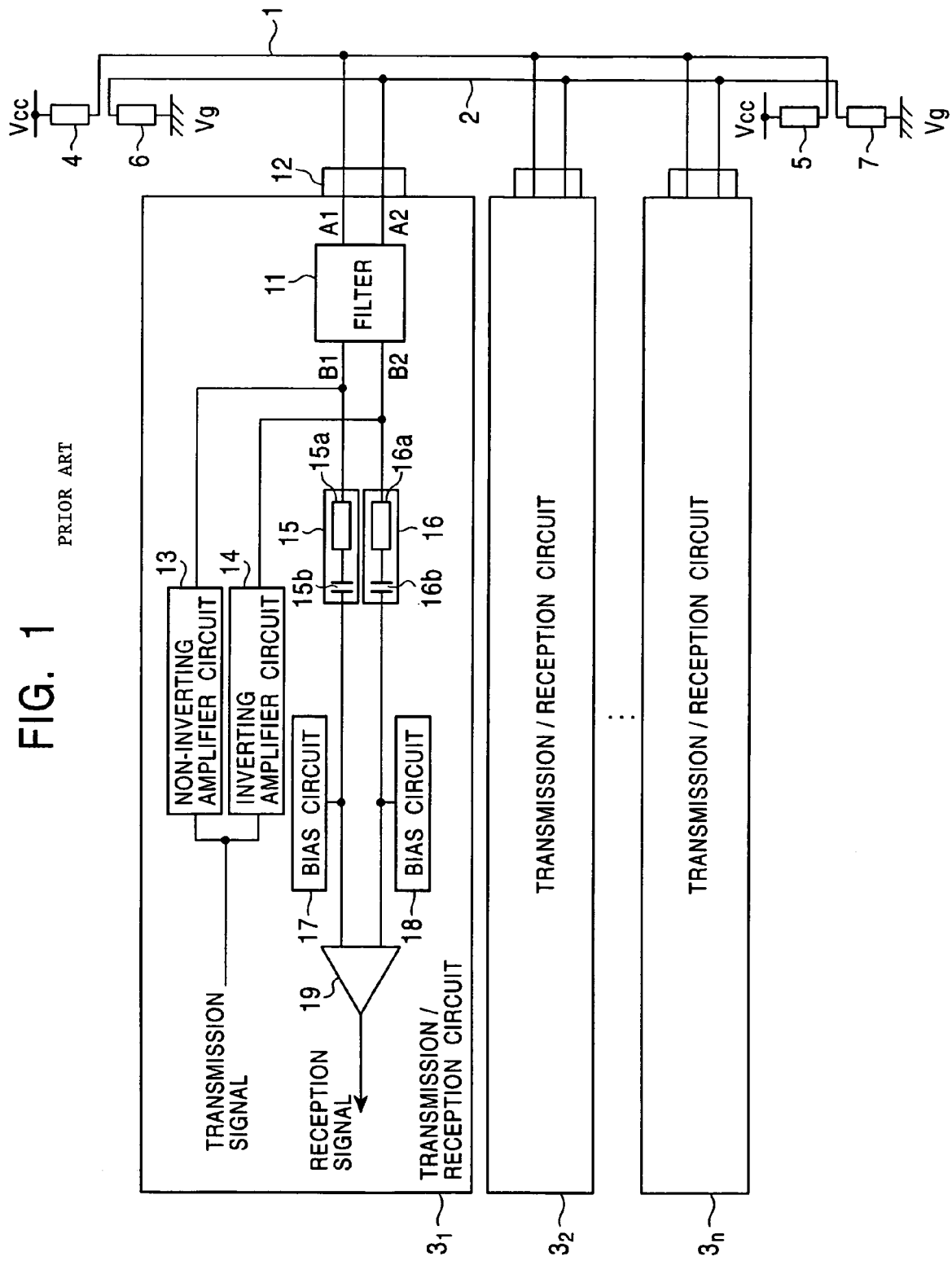
FIG. 1 is a block diagram of a conventional communication system.
Figure 3:
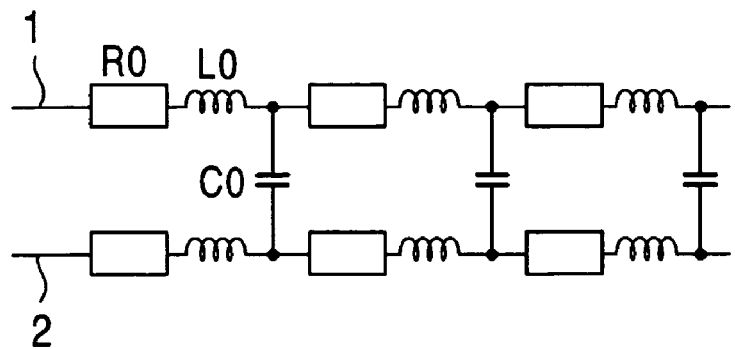
FIG. 3 is a diagram showing a circuit equivalent to two-wire type transmission lines.
Figure 4:
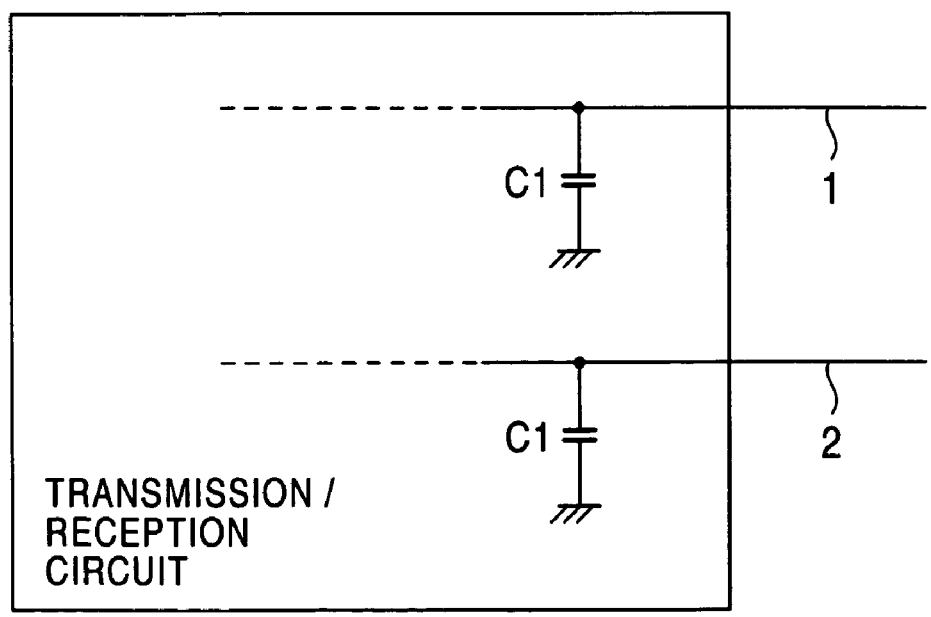
FIG. 4 is a diagram showing capacitances in a transmission/reception circuit.
Figure 5:
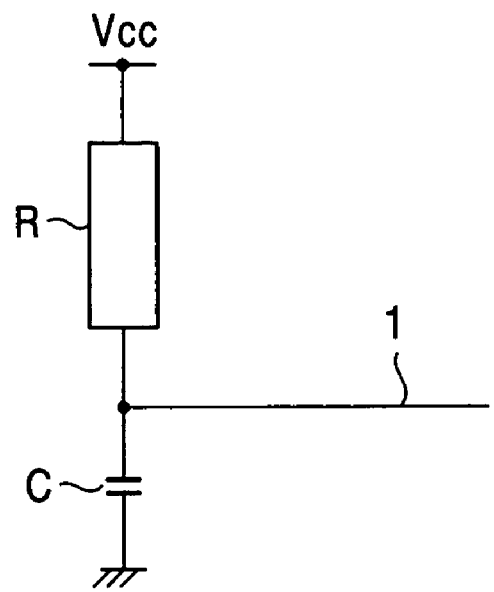
FIG. 5 is a diagram showing a time constant circuit in a transmission line as viewed from a receiving end.
Figure 6:
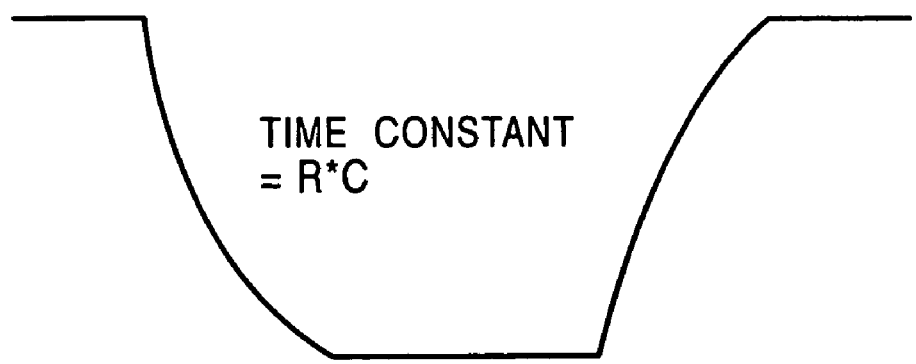
FIG. 6 is a diagram showing a waveform of a transmission signal.
Figure 7:
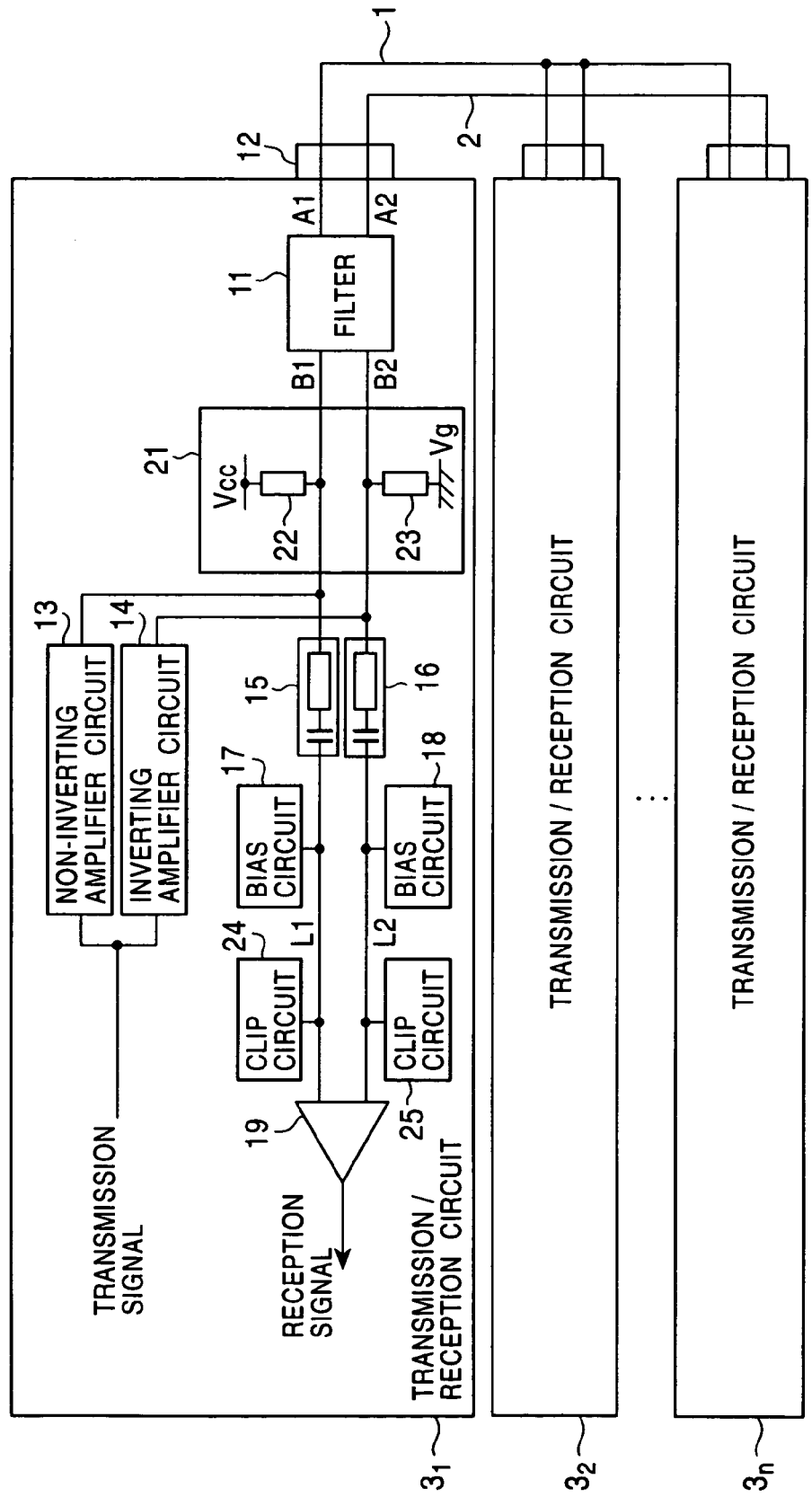
FIG. 7 is a block diagram of an embodiment of the invention.

FIG. 7 shows a communication system according to the invention in which parts identical to those in the conventional communication system shown in FIG. 1 are indicated by like reference numbers. No terminating resistor is directly connected to two-wire type transmission lines 1 and 2. In a transmission/reception circuit $3_1$, an inverting amplifier circuit 14 and an AC coupling circuit 15 are connected to a connection terminal B1 of a filter 11 located opposite to terminals A1 and A2 connected to the transmission lines 1 and 2, and a non-inverting amplifier circuit 13 and an AC coupling circuit 16 are connected to a connection terminal B2, which has a configuration similar to that of a conventional system. In the communication system according to the invention, however, a distributed termination circuit 21 is further connected to the connection terminals B1 and B2. The distributed termination circuit 21 is formed by terminating resistors 22 and 23. The terminating resistor 22 is provided to supply a positive potential Vcc to the connection terminal B1, and the terminating resistor 23 is provided to supply a ground potential Vg to the connection terminal B2.

Bias circuits 17 and 18 and clip circuits 24 and 25 are connected to lines L1 and L2 extending from the AC coupling circuits 15 and 16 to a differential amplifier 19. The clip circuit 24 limits a biased signal BIASA on the line L1 to a first clip level CLIP1 when the biased signal BIASA otherwise would fall below the first clip level CLIP1, and the clip circuit 25 limits a biased signal BIASB on the line L2 to a second clip level CLIP2 when the biased signal BIASB otherwise would exceed the second clip level CLIP2.

Transmission/reception circuits $3_2$ through $3_n$ have the same configuration as that of the transmission/reception circuit $3_1$ described above.

In the communication system having the above-described configuration, when a transmission signal is output, the transmission signal is amplified by the non-inverting amplifier circuit 13 and is inverted and amplified by the inverting amplifier circuit 14. Transmission signals in opposite phases are supplied from the non-inverting amplifier circuit 13 and inverting amplifier circuit 14 to the filter 11. The filter 11 performs low-pass filtering of those transmission signals separately. The transmission signal output by the non-inverting amplifier circuit 13 is supplied to the transmission line 2 through the filter 11, and the transmission signal output by the inverting amplifier circuit 14 is supplied to the transmission line 1 through the filter 11.

A signal transmitted over each of the respective transmission lines 1 and 2 is supplied to the filter 11, and the filter 11 performs low-pass filtering of those transmission signals separately to output the signals to the AC coupling circuits 15 and 16. The AC coupling circuits 15 and 16 extracts AC components in the transmission signals and supplies the components to the bias circuits 17 and 18.

Such a mode of transferring transmission signals is similar to that in a conventional communication system.

Figure 8A:
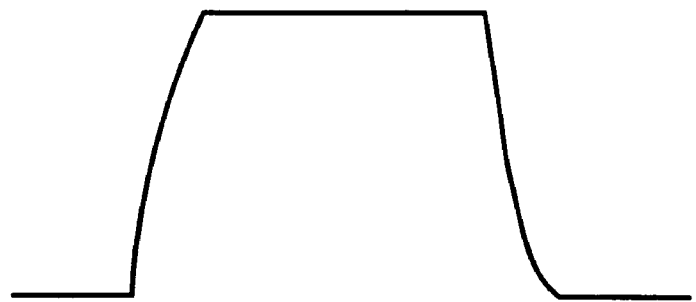
FIGS. 8A and 8B are diagrams showing waveforms of transmission signals.

Normally, a rising and falling waveform of the transmission signal is obtained on the transmission line 1 or 2 as shown in FIG. 8A. A total resistance R of the resistor 22 or 23 in each of the transmission/reception circuits $3_1$ through $3_n$ and a capacitance C consisting of capacitances C0 and C1 as described above act on the waveform to impose a time constant on the transmission line 1 as viewed from each of the transmission/reception circuits $3_1$ through $3_n$.

Figure 8B:
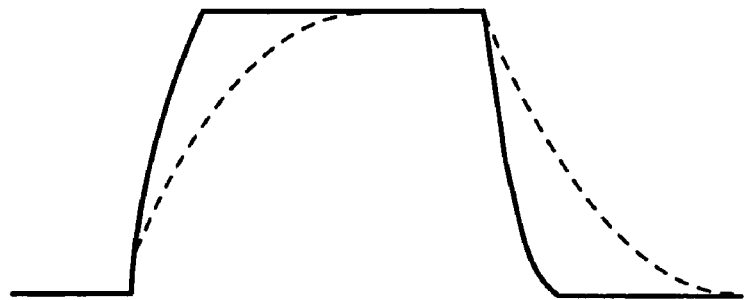

In the communication system according to the invention, however, since the terminating resistors 22 and 23 are provided in each of the transmission/reception circuits $3_1$ through $3_n$, any increase in the time constant can be prevented by the terminating resistor 22 in each of the transmission/reception circuits $3_1$ through $3_n$, for example, when there is a break somewhere in the transmission line 1. Specifically, a resistance R of a terminating resistor directly connected to the transmission line 1 as seen in a conventional communication system is doubled in such a case, which also doubles the time constant. On the contrary, in the communication system according to the invention, the terminating resistors 22 and 23 provided in each of the transmission/reception circuits $3_1$ through $3_n$ prevent the time constant from being increased, e.g., doubled when the transmission line is broken. As a result, substantially no change occurs in the rising and falling waveforms of signals transmitted over the transmission lines 1 and 2 as shown in FIG. 8B. In the transmission/reception circuits $3_1$ through $3_n$, it is therefore possible to obtain an accurate reception signal from a transmission signal even when there is a break of the transmission line. The broken line in FIG. 8B represents a waveform that appears when there is a break in a transmission line in a conventional communication system.

Increase in the time constant can be similarly prevented also in the case of poor contact between each of the transmission/reception circuits $3_1$ through $3_n$ and the transmission line 1 or 2, and a transmission/reception circuit can obtain an accurate reception signal from a transmission signal.

Figure 9A:
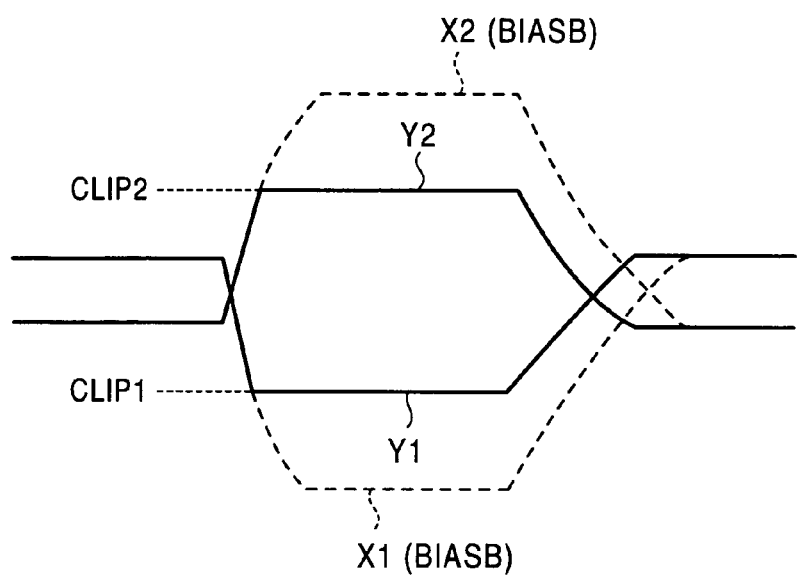
FIGS. 9A and 9B are waveform diagrams showing a clipping operation.

Further, in the communication system according to the invention, the clip circuits 24 and 25 are connected to the lines L1 and L2 extending from the AC coupling circuits 15 and 16 to the differential amplifier 19 along with the bias circuits 17 and 18. The clip circuit 24 limits a biased signal BIASA on the line L1 to a first clip level CLIP1 as indicated by the solid line Y1 in FIG. 9A when the biased signal BIASA otherwise would fall below the first clip level CLIP1 as indicated by the broken line X1 in FIG. 9A, and the clip circuit 25 limits a biased signal BIASB on the line L2 to a second clip level CLIP2 as indicated by the solid line Y2 in FIG. 9A when the biased signal BIASB otherwise would exceed the second clip level CLIP2 as indicated by the broken line X2 in FIG. 9A.

Figure 9B:
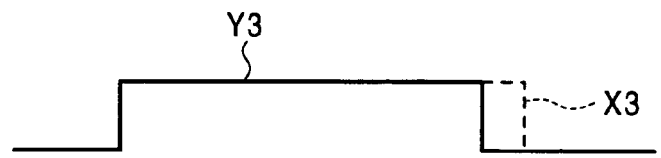

The clip circuits 24 and 25 causes the characteristic trailing edges of the transmission signals indicated by the solid line Y1 and Y2 to change earlier than the characteristic trailing edges indicated by the broken lines X1 and X2 by time T. Therefore, the differential amplifier 19 outputs a reception signal waveform as indicated by the solid line Y3 in FIG. 9B which is a pulse waveform rising earlier than a waveform (indicated by the broken line X3) that is generated without the clip circuits 24 and 25 by time T. This makes it possible to improve the characteristics of a trailing edge of the reception signal.

Figure 10A:
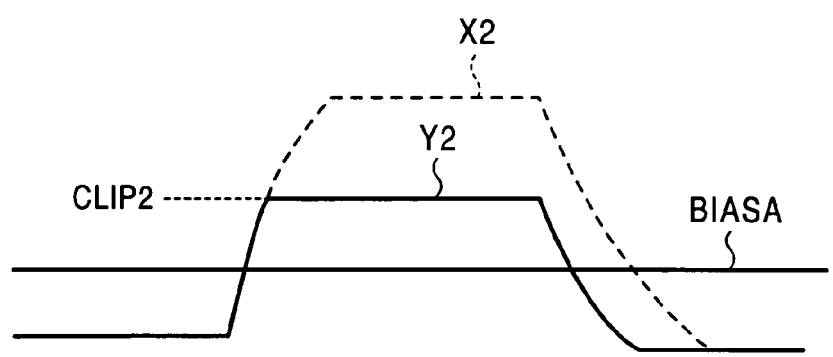
FIGS. 10A and 10B are waveform diagrams showing a clipping operation at the time of breakage of a transmission line.
Figure 10B:
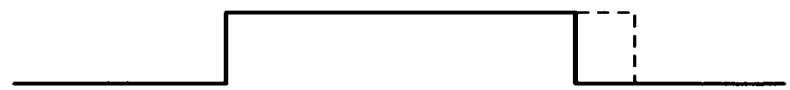

When there is a break in the transmission line 1, since only the signal B is transmitted over the transmission line 2, the biased signal BIASB is obtained as a result of application of a bias voltage to the signal B transmitted over the transmission line 2 with the biased signal BIASA remaining constant and unchanged, as shown in FIG. 10A. In this case, the clip circuit 25 again limits the biased signal BIASB on the line L2 to the second clip level CLIP2 as indicated by the solid line Y2 in FIG. 10A when the biased signal BIASB on the line 2 otherwise would exceed the second clip level CLIP2 as indicated by the broken line X2 in FIG. 10A. The differential amplifier 19 compares the level indicated by the solid line 2 with the constant biased signal BIASA to provide a reception signal which decreases earlier as shown in FIG. 10B. This makes it possible to improve the characteristics of a trailing edge of the reception signal.

Figure 11:
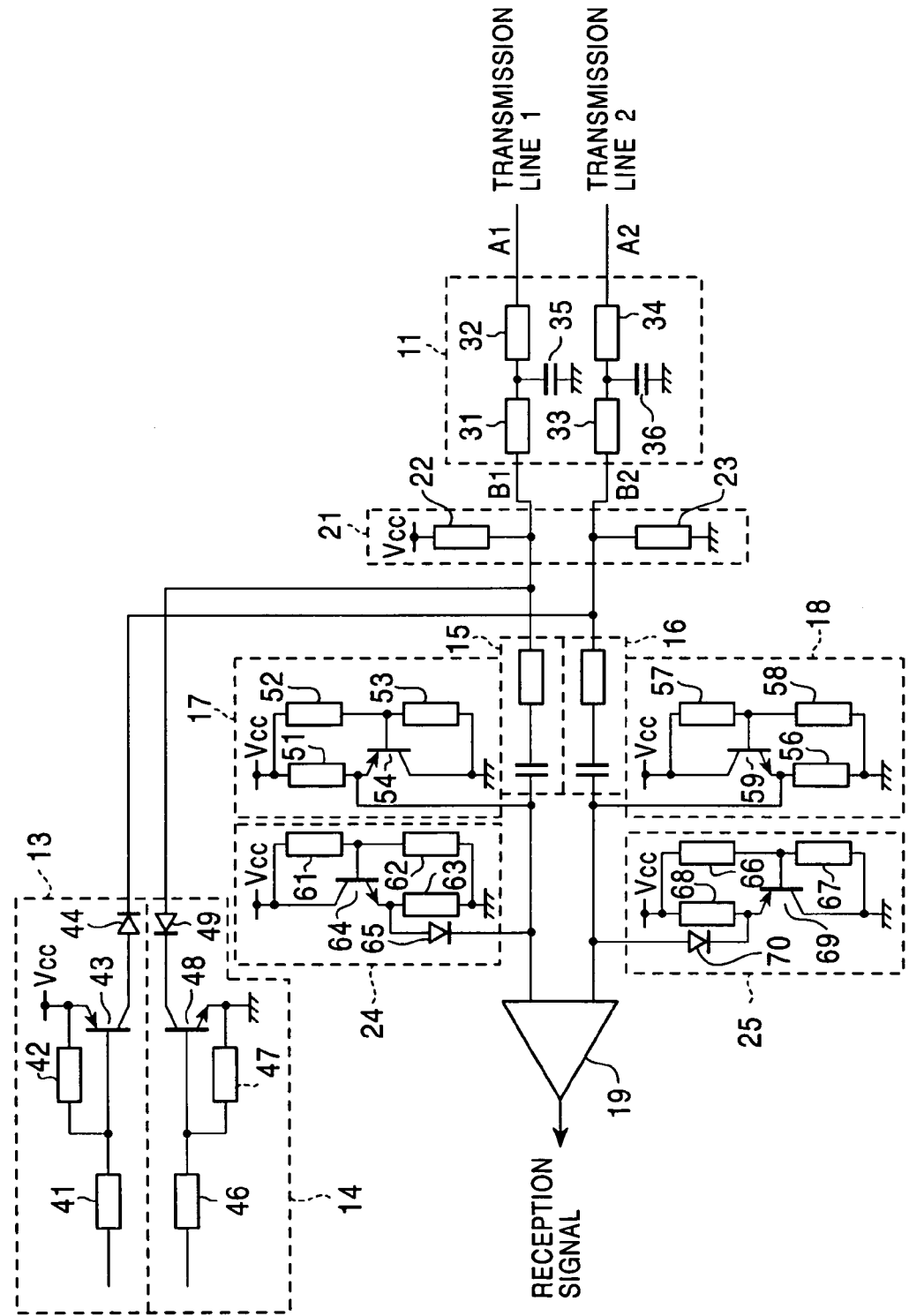
FIG. 11 is a circuit diagram showing a specific configuration of a transmission/reception circuit.

FIG. 11 shows an example of a specific configuration of the filter 11, non-inverting amplifier circuit 13, inverting amplifier circuit 14, bias circuits 17 and 18 and clip circuits 24 and 25 in the above-described transmission/reception circuit. Specifically, the filter 11 is formed by resistors 31 through 34 and capacitors 35 and 36. The non-inverting amplifier circuit 13 has resistors 41 and 42, a PNP transistor 43 and a diode 44, and the inverting amplifier circuit 14 has resistors 46 and 47, an NPN transistor 48 and a diode 49. The bias circuit 17 is formed by resistors 51 through 53 and a PNP transistor 54, and the bias circuit 18 is formed by resistors 56 through 58 and an NPN transistor 59. The clip circuit 24 is formed by resistors 61 through 63, a PNP transistor 64 and a diode 65, and the clip circuit 25 is formed by resistors 66 through 68, a PNP transistor 69 and a diode 70.

While a node was described as a transmission/reception circuit in the above embodiment, separate nodes may serve as a transmission circuit and a reception circuit.

As described above, according to the invention, since each node incorporates terminating resistors associated with two-wire type transmission lines, no increase occurs in the time constant of the two-wire type transmission lines as viewed from the node even when there is a break in one of the transmission lines or poor contact between the node and the transmission line. It is therefore possible to accurately obtain a reception signal from a signal transmitted over the two-wire type transmission lines without any significant reduction in the communication speed.

According to the invention, there is provided an AC coupling circuit for extracting AC components in a transmission signal input through a transmission line, a bias circuit for applying a bias voltage to the signal output from the AC coupling circuit and a clip circuit for clipping the level of the signal output from the bias circuits which are associated with each of the two-wire type transmission lines. This makes it possible to improve the characteristics of the trailing edge of a reception signal even when a transmission signal having a transient waveform under influence of a large time constant is received, which allows high speed communication.

What is claimed is:

1. A communication system utilizing two-wire transmission lines for transmitting a transmission signal represented by two AC components being opposite in phase appearance, comprising:

a plurality of nodes respectively connected to said two-wire transmission lines, each of said nodes having therewithin:

a low pass filter connected to said transmission lines, two terminating resistors respectively connected to said transmission lines via said low pass filter, and a reception circuit for receiving said transmission signal, said reception circuit including:

an AC coupling circuit for extracting said AC components from said transmission signal on said transmission lines;

a bias circuit for applying a bias voltage to the AC components extracted by said AC coupling circuit; and a clip circuit for clipping the level of each of the extracted AC components, wherein said clip circuit comprises: a resistor having one terminal connected to a reference potential; a bias current supply circuit for supplying a fixed bias current to said resistor; and a diode connected between the other terminal of said resistor and an output line of said AC coupling circuit.

2. A reception circuit for receiving a transmission signal represented by two AC components being opposite in phase and appearing in a communication system utilizing two-wire type transmission lines, comprising:

an AC coupling circuit for extracting said AC components from said transmission lines;

two bias circuits being independent from each other and each for applying a bias voltage to each of the AC components extracted by said AC coupling circuit; and two clip circuits being independent from each other and each for clipping the level of each of the biased AC components at levels between a potential and a ground level, wherein each of said clip circuit comprises: a resistor having one terminal connected to a reference potential; a bias current supply circuit for supplying a fixed bias current to said resistor; and a diode connected between the other terminal of said resistor and an output line of said AC coupling circuit.

* * * * *